US010994226B2

(12) United States Patent
Cordatos et al.

(10) Patent No.: US 10,994,226 B2
(45) Date of Patent: May 4, 2021

(54) FUEL DEOXYGENATION WITH A SPIRAL CONTACTOR

(71) Applicant: Hamilton Sundstrand Corporation, Charlotte, NC (US)

(72) Inventors: Haralambos Cordatos, Colchester, CT (US); Sergei F. Burlatsky, West Hartford, CT (US); Mallika Gummalla, Avon, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 112 days.

(21) Appl. No.: 16/130,360

(22) Filed: Sep. 13, 2018

(65) Prior Publication Data
US 2020/0086239 A1    Mar. 19, 2020

(51) Int. Cl.
*B01D 19/00* (2006.01)
*B64D 37/34* (2006.01)
*B01D 53/22* (2006.01)

(52) U.S. Cl.
CPC ..... *B01D 19/0057* (2013.01); *B01D 19/0005* (2013.01); *B01D 19/0026* (2013.01); *B01D 19/0068* (2013.01); *B64D 37/34* (2013.01); *B01D 2053/221* (2013.01); *B01D 2257/104* (2013.01)

(58) Field of Classification Search
CPC ............ B01D 19/0005; B01D 19/0021; B01D 19/0026; B01D 19/0057; B01D 19/0068; B01D 2053/221; B01D 2257/104
See application file for complete search history.

(56) References Cited

U.S. PATENT DOCUMENTS

| 7,459,081 | B2 * | 12/2008 | Koenig ................ B01F 5/0476 166/305.1 |
| 9,656,187 | B2 | 5/2017 | Lo et al. |
| 9,687,773 | B2 | 6/2017 | Johnson et al. |
| 9,834,315 | B2 | 12/2017 | Lo et al. |
| 2005/0211096 | A1 | 9/2005 | Burlatsky et al. |
| 2013/0312376 | A1 * | 11/2013 | Huff ...................... B01D 45/16 55/457 |
| 2014/0252171 | A1 | 9/2014 | Dooley et al. |
| 2015/0314229 | A1 | 11/2015 | Johnson et al. |

OTHER PUBLICATIONS

Extened European Search Report for Application No. 19198094.6-1101, dated Oct. 30, 2019, 10 pages.

\* cited by examiner

*Primary Examiner* — Sharon Pregler

(74) *Attorney, Agent, or Firm* — Cantor Colburn LLP

(57) ABSTRACT

Provided are techniques that include operating a spiral contactor. The techniques include receiving, by a spiral contactor, a first fluid, and receiving a second fluid, wherein the first fluid is different than the second fluid. The techniques also include exchanging the first fluid and the second fluid using the spiral contactor, and outputting a deoxygenated fluid from the spiral contactor, wherein the deoxygenated fluid has a lower oxygen concentration than the first fluid.

14 Claims, 5 Drawing Sheets

FUEL DEOXYGENATION WITH A SPIRAL CONTACTOR

BACKGROUND

The present invention generally relates to deoxygenation systems, and more specifically, to fuel deoxygenation with a spiral contactor.

In today's environment, many vehicles and aircraft rely on fuel as the primary source used in combustion engines. Fuel stabilization technologies require the removal of the dissolved oxygen for optimum performance. In addition, fuel stabilization will be required on next-generation aircraft in order to meet performance and operability targets as thermal loads increase while fuel flow decreases.

BRIEF DESCRIPTION

According to an embodiment, a device is provided. The device includes a first inlet configured to receive a fluid; a hollow-shaped body configured to provide the fluid for gas exchange; a first outlet configured to output the fluid, wherein the first inlet is coupled to a first end of the hollow-shaped body and the first outlet is coupled to a second end of the hollow-shaped body; a second input configured to receive a gas for gas exchange with the fluid and provide the gas over the hollow-shaped body; and a second outlet configured to output a mixture comprising the gas and the fluid.

In addition to one or more of the features described herein, or as an alternative, further embodiments include a fluid that is fuel and a gas that is nitrogen.

In addition to one or more of the features described herein, or as an alternative, further embodiments include a hollow-shaped body including one or more structures arranged on the hollow-shaped body configured to stimulate the fluid for gas exchange.

In addition to one or more of the features described herein, or as an alternative, further embodiments include a diameter of the first end of the hollow-shaped body is less than a diameter of the second end of the hollow-shaped body.

In addition to one or more of the features described herein, or as an alternative, further embodiments include a device that is configured to rotate to create centrifugal force to form a thin layer of the fluid.

In addition to one or more of the features described herein, or as an alternative, further embodiments include at least one of a hollow-shaped body that has circular cross-section or an elliptical cross-section.

In addition to one or more of the features described herein, or as an alternative, further embodiments include a device that is a spiral contactor.

According to another embodiment, a system is provided. The system includes a fuel tank including at least a first compartment and a second compartment; and a spiral contactor coupled to the fuel tank, wherein the spiral contactor includes a first inlet configured to receive a fluid; a hollow-shaped body configured to provide the fluid for gas exchange; a first outlet configured to output the fluid, wherein the first inlet is coupled to a first end of the hollow-shaped body and the first outlet is coupled to a second end of the hollow-shaped body; a second input configured to receive a gas for gas exchange with the fluid and provide the gas over the hollow-shaped body; and a second outlet configured to output a mixture comprising the gas and the fluid.

In addition to one or more of the features described herein, or as an alternative, further embodiments include the fuel tank having a first compartment and a second compartment, wherein the first compartment comprises a pump to provide fuel to the second compartment; and wherein the second compartment includes the spiral contactor that is configured to filter the fuel from the second compartment.

In addition to one or more of the features described herein, or as an alternative, further embodiments include a spiral contactor that is located in a top portion of the second compartment of the fuel tank.

In addition to one or more of the features described herein, or as an alternative, further embodiments include an air separation membrane that is fluidly coupled to the second inlet of the spiral contactor, wherein the air separation membrane is configured to separate the gas.

In addition to one or more of the features described herein, or as an alternative, further embodiments include a first outlet of the spiral contactor that is fluidly coupled to a downstream membrane-based device.

In addition to one or more of the features described herein, or as an alternative, further embodiments include hollow-shaped body that includes one or more structures arranged on the hollow-shaped body configured to stimulate the fluid for gas exchange.

In addition to one or more of the features described herein, or as an alternative, further embodiments include a diameter of the first end of the hollow-shaped body is less than a diameter of the second end of the hollow-shaped body.

In addition to one or more of the features described herein, or as an alternative, further embodiments include at least one of a hollow-shaped body has a circular cross-section or an elliptical cross-section.

In addition to one or more of the features described herein, or as an alternative, further embodiments include a device that is a spiral contactor.

According to a different embodiment, a method of operating a spiral contactor is provided. The method includes receiving, by a spiral contactor, a first fluid; receiving a second fluid, wherein the first fluid is different than the second fluid; exchanging the first fluid and the second fluid using the spiral contactor; and outputting a deoxygenated fluid from the spiral contactor, wherein the deoxygenated fluid has a lower oxygen concentration than the first fluid.

In addition to one or more of the features described herein, or as an alternative, further embodiments include exchanging the first fluid and second fluid including rotating the spiral contactor receiving the first fluid and flowing the second fluid over the spiral contactor to mix the first fluid and the second fluid.

In addition to one or more of the features described herein, or as an alternative, further embodiments include coupling an output of the spiral contactor to a membrane-based device.

In addition to one or more of the features described herein, or as an alternative, further embodiments include detecting a failure of the membrane-based device; and responsive to the detection, the output of the spiral contactor bypasses the membrane-based device.

Technical effects of embodiments of the present disclosure include using a device which leverages centrifugal force to form a thin fuel layer and interface the thin fuel layer with nitrogen-enriched air to achieve partial deoxygenation.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Turning now to an overview of technologies that is more specifically relevant to aspects of the invention, aircraft use fuel for combustion during operation. The fuel must be stored prior to being supplied to the combustion engine, and therefore, the fuel must be stored safely. Fuel tank inerting reduces the oxygen concentration in the fuel tank to reduce the chances of unwanted sparks leading to catastrophic events. For safety reason, if the oxygen concentration is less than 10% in the ullage, it is likely that combustion will not occur. The oxygen concentration of ambient air is approximately 20%. Fuel tank inerting wherein nitrogen is added to the ullage. In some configurations, the nitrogen-enriched air is provided to the ullage of the fuel tank to displace ambient air and reduce the oxygen concentration.

In addition to combustion, fuel can serve as a heat sink on some aircraft and absorb heat from engine accessories. At high temperatures, however, the fuel reacts with dissolved oxygen in the fuel to form solid deposits in the fuel passages reducing the ability to remove heat. The solid deposits can foul surfaces for heat exchange and clog fuel system components. When fuel is heated above approximately 275 F, the increased rate of these auto-oxidation reactions becomes problematic for typical aircraft fuel system maintenance intervals.

The dissolved oxygen limits the amount of heat that can be rejected to fuel. The next generation aircraft will have more heat loads and less fuel flow to reject heat on account of more efficient engine technology.

The techniques described herein provide a spiral contactor to reduce the oxygen concentration of the fuel before supplying the fuel to a deoxygenator. This allows for a smaller deoxygenator to be used in the system if a deoxygenator is required at all.

Figure 1:
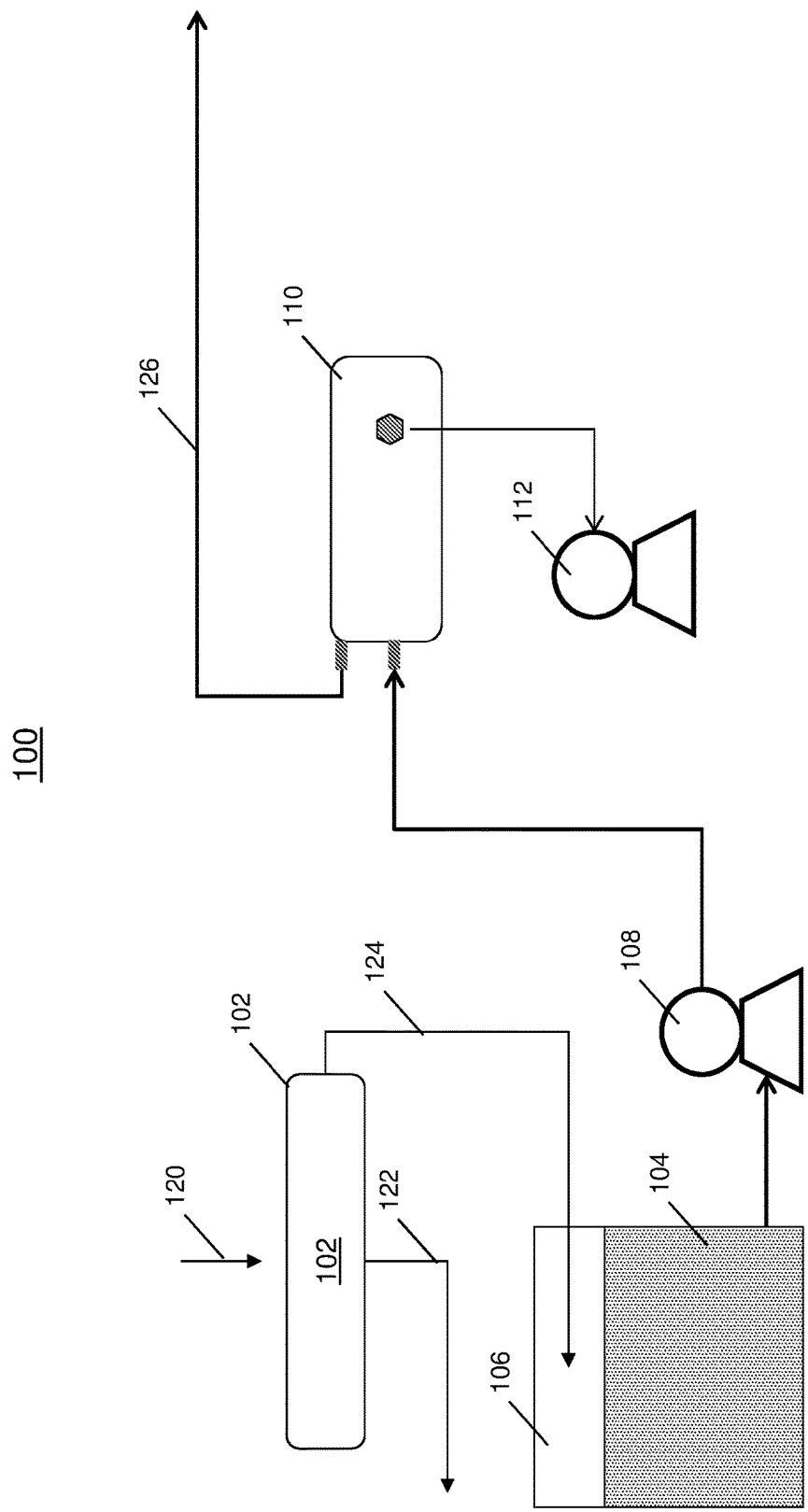
FIG. 1 depicts a schematic of an inerted fuel tank and fuel deoxygenation a system.

Turning now to FIG. 1, an inerted fuel tank and fuel deoxygenation system 100 is shown. The system 100 includes an air separation membrane 102 that is configured to receive an input fluid source and separate one or more elements of the fluid. In a non-limiting example, the input source is air 120, such as bleed air from an aircraft engine.

The air separation membrane 102 is configured to separate the elements of the air into an oxygen (O2) enriched air 122 and a nitrogen (N2) enriched air 124. The air separation membrane 102 is fluidly coupled to a fuel tank 104 and is configured to supply the nitrogen-enriched air 124 to a fuel tank 104. In particular, the nitrogen-enriched air 124 is provided to the ullage 106 of the fuel tank 104 to remove oxygen from fuel tank 104. In a different configuration, other nitrogen sources can be supplied to the fuel tank 104 to remove the oxygen from the ullage 106 of the fuel tank 104. In some applications, for inerting purposes, the ullage of the tank is maintained at approximately 10% or less.

Also shown in FIG. 1, the fuel pump 108 is configured to pump fuel from the fuel tank 104 to the deoxygenator 110. The deoxygenator 110 is configured to filter the fuel received from the fuel pump 108 and provide the fuel to other components of the system. The deoxygenator 110 is coupled to a vacuum pump 112 and includes a filter that has a large surface area which directly impacts the size, weight, and the amount of oxygen that can be removed from the fuel. As shown with reference to FIG. 2, the surface area of the deoxygenator 110 has an exponential relationship to the desired reduction in oxygen concentration. The deoxygenated fuel 126 is provided to various components in the system.

Figure 2:
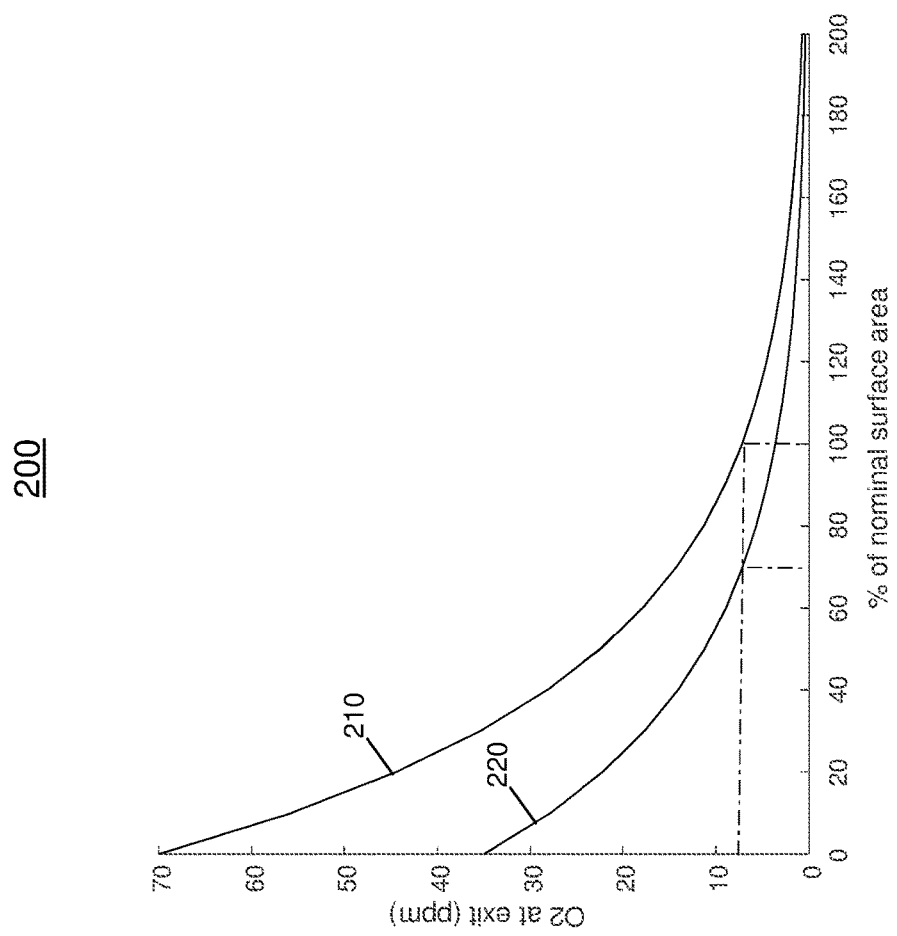
FIG. 2 depicts a graph representing the membrane surface area requirements for oxygen in fuel.

Now referring to FIG. 2, a graph 200 illustrating the relationship of the membrane surface area requirements to the desired oxygen concentration is shown. As discussed above, the membrane-based device can be a deoxygenator 110 of FIG. 1. The x-axis of the graph 200 represents a percentage (%) of the nominal surface area of the membrane-based device that is required to achieve a given oxygen concentration and the y-axis represents the oxygen concentration in parts per million (ppm) at the exit of the membrane-based device.

In FIG. 2, the curve 210 illustrates the oxygen concentration in fuel at equilibrium with ambient air is 70 ppm. At 100% of the nominal surface area of a given membrane of the curve 210, the oxygen concentration at the outlet of the deoxygenator is approximately 7 ppm. The curve 220 illustrates the oxygen concentration in fuel at equilibrium with inerted ullage (10% O2) is 35 ppm. In order to achieve the same oxygen concentration of 7 ppm where the membrane-based device receives the oxygen concentration at equilibrium with the inerted ullage, only approximately 70% of the nominal surface area is required. Therefore, the membrane-based device operating with 35 ppm oxygen concentration in the fuel at the inlet can be designed to be roughly 30% smaller than a device operating with 70 ppm oxygen concentration at the inlet. Therefore, by reducing oxygen concentration of the fuel that is to be filtered, the membrane-based device can be reduced in size, thereby reducing the overall weight and size of the device while maintaining the filtration efficiency. For applications requiring high levels of deoxygenation, this can amount in major savings given the exponential increase in membrane surface area with decreasing O2 at exit requirement.

Turning now to an overview of the aspects of the invention, one or more embodiments of the invention address the above-described shortcomings of the prior art by providing a spiral contactor 300 to reduce the oxygen concentration of fuel so the formation of carbonaceous deposits will be reduced as fuel temperature increases. The above-described aspects of the invention address the shortcomings of the prior art by rotating the spiral contactor 300 having structures to improve the gas exchange to efficiently reduce the oxygen concentration.

Figure 3:
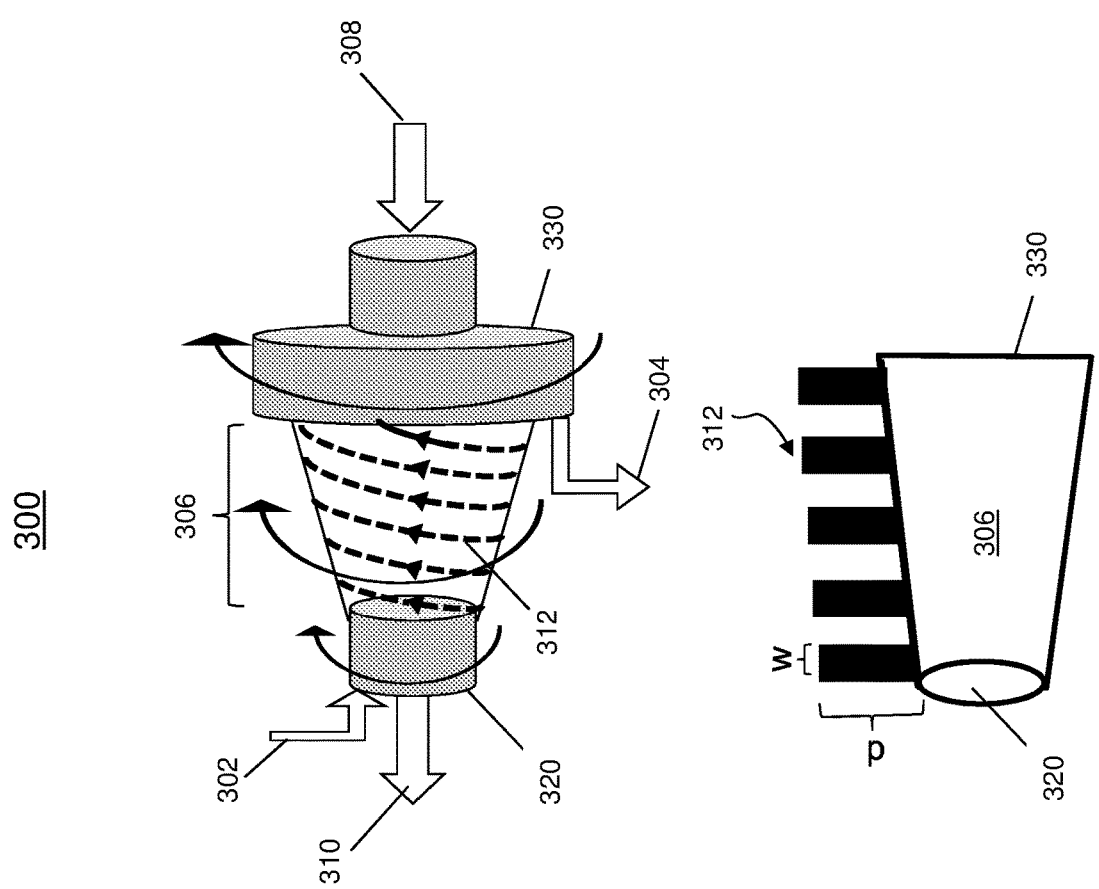
FIG. 3 depicts a spiral contactor in accordance with one or more embodiments.

Turning now to a more detailed description of aspects of the present invention, FIG. 3 depicts a spiral contactor 300 in accordance with one or more embodiments. The spiral contactor 300 is configured to promote the rapid deoxygenation by thinning the fuel to a low film thickness. The spiral contactor 300, by reducing the film thickness of the fuel, increases the residence time the fuel is in contact with nitrogen.

The spiral contactor 300 includes a first inlet 302 that is configured to receive fuel and a first outlet 304 that is configured to supply the partly deoxygenated fuel for use. As shown in FIG. 3, the hollow-shaped body 306 of the spiral contactor 300 is coupled to the first inlet 302 on a first side 320 of the spiral contactor 300 and outlet 304 on a second side 330. In some non-limiting examples, the hollow-shaped body 306 can be conical, spherical, cylindrical, or elliptical in shape. In some embodiments, the diameter of a first side 320 of the first inlet 302 is less than the diameter of a second side 330 of the first outlet 304. It should be understood the hollow-shaped body 306 can include other geometrical configurations and not limited by the examples discussed herein.

The hollow-shaped body 306 includes structures 312 that are on the surface of the hollow-shaped body 306 that are configured to disrupt the fuel and improve the mixing of the fluid and gases that are flowed over the fuel. As shown in FIG. 3, the structures 312 extend outwardly from the hollow-shaped body 306 of the spiral contactor 300 such as in a ribbed-shaped fashion. It is to be understood that various types, geometries and dimensions of structures 312 can be used in the surface of the spiral contactor 300 to interrupt the flow of the fuel. As shown in FIG. 3, the height (d) and width (w) of the structures 312 impact the flow rate of the spiral contactor by the following equation:

$$\frac{\tau_{ribbed\,centrifuagal\,flow}}{\tau_{straight\,flow}} = f\left(1 + \frac{2d}{w}\right)$$

In a non-limiting example, the residence time for the nitrogen-fuel contact is increased by a factor of 7 or higher compared to straight flow paths of the spiral contactor 300 when d/w=3.

The spiral contactor 300 also includes a second inlet 308 that is configured to receive a gas, such as nitrogen, and supply the gas over the fuel on surface of the hollow-shaped body 306 to perform the deoxygenation of the fuel. As shown in FIG. 3 the second inlet 308 is coupled to a side of the hollow-shaped body 306 having the first outlet 304. The second outlet 310 is configured to expel a mixture of the gases, such as a mixture of nitrogen and oxygen. In one or more embodiments, the gas is selected to maximize oxygen removal from the fuel, such as nitrogen, as in comes into contact with the fuel. The second outlet 310 is located on a side of the hollow-shaped body 306 as the first inlet 302.

In one or more embodiments, the spiral contactor 300 is rotated, by a mechanism such as a motor (not shown), to further stimulate the fuel flow and gas exchange by the spiral contactor 300. The rotational speed of the spiral contactor 300 can be configured according to its application. The rotation of the spiral contactor 300 forces the fuel into a thin layer at the wall of the hollow-shaped body 306 of the spiral contactor 300 and the fuel progresses towards the first outlets 304 as the gas is flowed over the thin layer of fuel.

Figure 4:
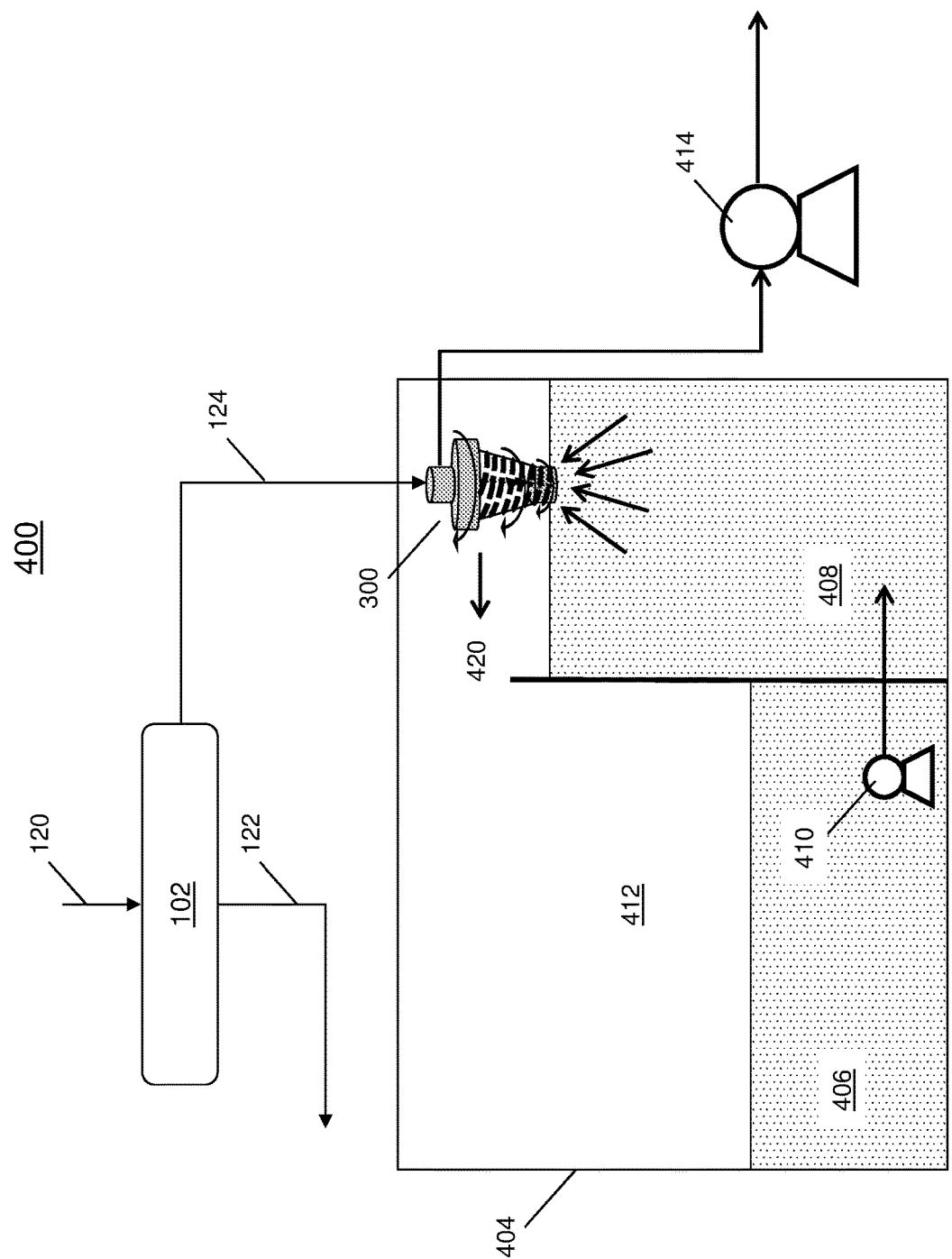
FIG. 4 depicts a schematic of the system in accordance with one or more embodiments.

Now referring to FIG. 4, a fuel deoxygenation system with spiral contactor 400 is shown. The system 400 includes an air separation membrane 102 that is coupled to a fuel tank 404. As shown, the fuel tank 404 includes a first compartment 406 and a second compartment 408 (collector cell), wherein the collector cell includes a spiral contactor 300 such as that shown in FIG. 3. Also, the first compartment 406 includes a pump 410 to pump the fuel into the collector cell 408 to a level that reaches the spiral contactor 300. The spiral contactor 300 is configured to pass the nitrogen-enriched air over the thin film of fuel and expel the nitrogen-enriched air 420 to the ullage 412 of the fuel tank.

The output of the spiral contactor 300 is provided to the fuel pump 414 and is further pumped to a deoxygenator. The fuel that is provided at the output of the spiral contactor 300 has reduced the oxygen concentration to a level where a smaller deoxygenator can be implemented downstream.

In one or more embodiments, the system 400 can be configured to detect a fault with the deoxygenator and bypass the use of the deoxygenator if the spiral contactor 300 removes a sufficient portion of oxygen for the application. In other embodiments, the spiral contactor 300 can be used alone to remove the oxygen from the fuel based on its application.

Figure 5:
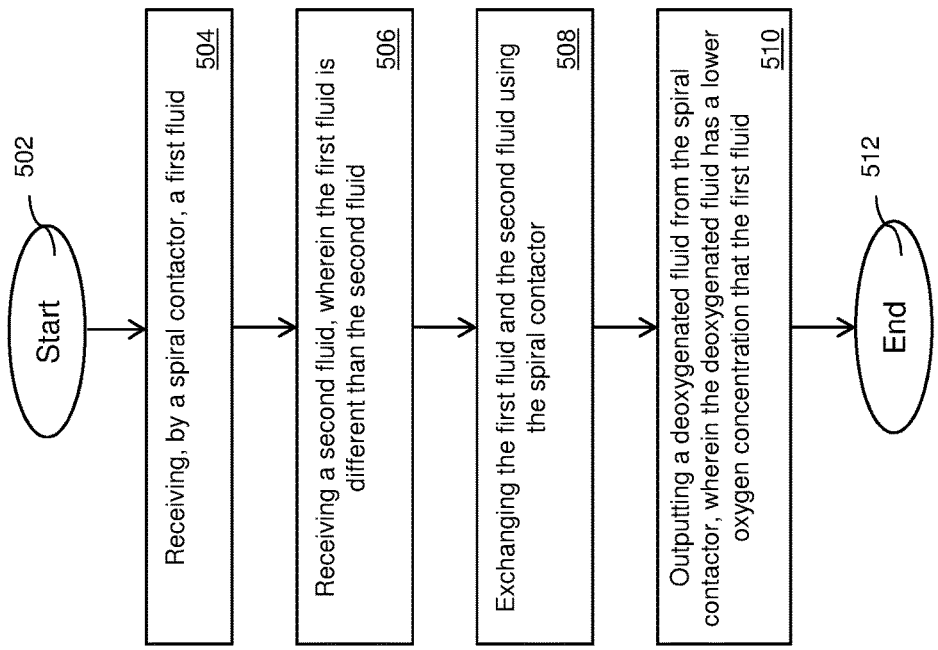
FIG. 5 depicts a flowchart of a method for operating a spiral contactor in accordance with one or more embodiments.

In FIG. 5, a flowchart of a method 500 for operating a deoxygenation device is shown. The method 500 begins at block 502 and continues to block 504 which provides. At block 504, the method 500 receives, by a spiral contactor a first fluid. In one or more embodiments, the first fluid is fuel. Block 506 provides for receiving a second fluid, wherein the first fluid is different than the second fluid. The second fluid is nitrogen-enriched air that is used to deoxygenate the fuel. The method 500 continues to block 508 which provides for exchanging the first fluid and the second fluid using the spiral contactor. The spiral contactor is used to thin the fuel and increase the resident time it is exposed to the nitrogen-enriched air to remove the oxygen. At block 510, the method 500 provides for outputting a deoxygenated fluid from the spiral contactor, wherein the deoxygenated fluid has a lower oxygen concentration than the first fluid. The method 500 ends at block 512.

The technical effects and benefits include reducing the oxygen concentration of the fuel allowing it to be used as a source of heat sink to remove heat from other components of the system. The technical effects and benefits include a reduction in the required size and weight of a membraned-based deoxygenator. In addition, the spiral contactor 300 can operate as a stand-alone solution for partial deoxygenation, performance enhancement of high-end membrane device, and making a less efficient membrane device more competitive. The spiral contactor 300 described herein can be used to enhance a less efficient membrane device or the spiral contactor 300 can be used alone. That is, in some applications the deoxygenator may not be required with the spiral contactor 300. In the event a failure of the deoxygenator is detected, it can be bypassed if the spiral contactor 300 is present. Some level of oxygen is removed from the fuel.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A device comprising:
    a first inlet configured to receive a fluid;
    a hollow-shaped body configured to port the fluid for gas exchange;
    a first outlet configured to output the fluid, wherein the first inlet is coupled to a first end of the hollow-shaped body and the first outlet is coupled to a second end of the hollow-shaped body, wherein a diameter of the first end of the hollow-shaped body is less than a diameter of the second end of the hollow-shaped body;
    a second input configured to receive a gas for gas exchange with the fluid and provide the gas over the hollow-shaped body; and
    a second outlet configured to output a mixture comprising the gas and the fluid, wherein the second outlet is connected to a fuel tank to displace ambient air and oxygen from an ullage of the fuel tank.

2. The device of claim 1, wherein the fluid is fuel and wherein the gas is nitrogen.

3. The device of claim 1, wherein the hollow-shaped body comprises one or more structures arranged on the hollow-shaped body configured to stimulate the fluid for gas exchange.

4. The device of claim 1, wherein the device is configured to rotate to create centrifugal force to form a thin layer of the fluid.

5. The device of claim 1, wherein the hollow-shaped body comprises at least one of a circular cross-section or an elliptical cross-section.

6. The device of claim 1, wherein the device is a spiral contactor.

7. A system comprising:
    a fuel tank comprising at least a first compartment and a second compartment; and
    a device coupled to the fuel tank, wherein the device comprises:
        a first inlet configured to receive a fluid;
        a hollow-shaped body configured to provide the fluid for gas exchange;
        a first outlet configured to output the fluid, wherein the first inlet is coupled to a first end of the hollow-shaped body and the first outlet is coupled to a second end of the hollow-shaped body, wherein a diameter of the first end of the hollow-shaped body is less than a diameter of the second end of the hollow-shaped body;
        a second input configured to receive a gas for gas exchange with the fluid and provide the gas over the hollow-shaped body; and
        a second outlet configured to output a mixture comprising the gas and the fluid, wherein the second outlet is connected to the fuel tank to displace ambient air and oxygen from an ullage of the fuel tank.

8. The system of claim 7, wherein the fuel tank includes a first compartment and a second compartment, wherein the first compartment comprises a pump to provide fuel to the second compartment; and
    wherein the second compartment comprises the device that is configured to filter the fuel from the second compartment.

9. The system of claim 8, wherein the device is located in a top portion of the second compartment of the fuel tank.

10. The system of claim 7, further comprising an air separation membrane that is fluidly coupled to the second inlet of the device, wherein the air separation membrane is configured to separate the gas.

11. The system of claim 7, wherein the first outlet of the device is fluidly coupled to a downstream membrane-based device.

12. The system of claim 7, wherein the hollow-shaped body comprises one or more structures arranged on the hollow-shaped body configured to stimulate the fluid for gas exchange.

13. The system of claim 7, wherein the hollow-shaped body comprises at least one of a circular cross-section or an elliptical cross-section.

14. The device of claim 7, wherein the device is a spiral contactor.

* * * * *